United States Patent
Salomaa

[11] Patent Number: 6,059,390
[45] Date of Patent: May 9, 2000

[54] SHELF ASSEMBLY

[76] Inventor: Aarre Toivo Juhani Salomaa, Ruukuntekijäntie 2 A 26, Fin-01600, Vantaa, Finland

[21] Appl. No.: 09/147,224
[22] PCT Filed: Apr. 30, 1997
[86] PCT No.: PCT/FI97/00264
  § 371 Date: Oct. 30, 1998
  § 102(e) Date: Oct. 30, 1998
[87] PCT Pub. No.: WO97/41048
  PCT Pub. Date: Nov. 6, 1997

[30] Foreign Application Priority Data

Apr. 30, 1996 [FI] Finland .................................. 961852

[51] Int. Cl.⁷ .................................................. A47B 88/00
[52] U.S. Cl. ................................. 312/348.3; 312/249.11; 312/319.8; 312/330.1; 211/59.2
[58] Field of Search ..................................... 312/348.3, 45, 312/72, 73, 121, 270.1, 270.3, 35, 124, 128, 283, 249.11, 330.1, 319.8; 211/59.2, 175, 151

[56] References Cited

U.S. PATENT DOCUMENTS

| | | |
|---|---|---|
| 1,306,257 | 6/1919 | Horix . |
| 2,799,399 | 7/1957 | Cannon ................................. 211/59.2 |
| 3,297,375 | 1/1967 | Reeves ............................ 312/270.3 X |
| 4,461,520 | 7/1984 | Alneng . |
| 4,478,338 | 10/1984 | Crosslen ........................... 211/128.1 X |
| 4,706,820 | 11/1987 | Spamer et al. . |
| 4,809,855 | 3/1989 | Bustos ................................... 211/59.2 |
| 5,123,545 | 6/1992 | Hickman ................................ 211/59.2 |
| 5,240,124 | 8/1993 | Buday .................................... 211/59.2 |
| 5,590,939 | 1/1997 | Piontek ............................ 312/270.1 X |

FOREIGN PATENT DOCUMENTS

| | | |
|---|---|---|
| 0 037 277A1 | 10/1981 | European Pat. Off. . |
| 46797 | 7/1973 | Finland . |
| 72641 | 3/1987 | Finland . |
| 1516613 | 1/1968 | France . |
| 2 402 912 | 8/1974 | Germany . |
| 26 31 488A1 | 2/1977 | Germany . |
| 39 36 770A1 | 5/1990 | Germany . |

OTHER PUBLICATIONS

OPTIMAX Data Sheet RT X76–34030, 1992.

Primary Examiner—Peter M. Cuomo
Assistant Examiner—Hanh V. Tran
Attorney, Agent, or Firm—Arent Fox Kintner Plotkin & Kahn PLLC

[57] ABSTRACT

A shelf assembly includes a shelf frame structure and at least one drawer. The drawer is arranged to be moved in relation to the shelf frame structure with aide of suitable guide devices along a linear path from a storage position inside the shelf frame structure to a position at least partly out of the shelf frame structure. The drawer is inclined such that goods placed on the drawer are arranged to move from a first end of the drawer to a second end of the drawer by gravity. The drawer is covered by a plate, and constructed such that an opening is formed to the first end of the drawer for charging of the goods, and an opening is formed to the second end of the drawer for discharging the goods. The drawer forms a flow-through shelf unit operating according to a first-in/first-out principle.

20 Claims, 2 Drawing Sheets

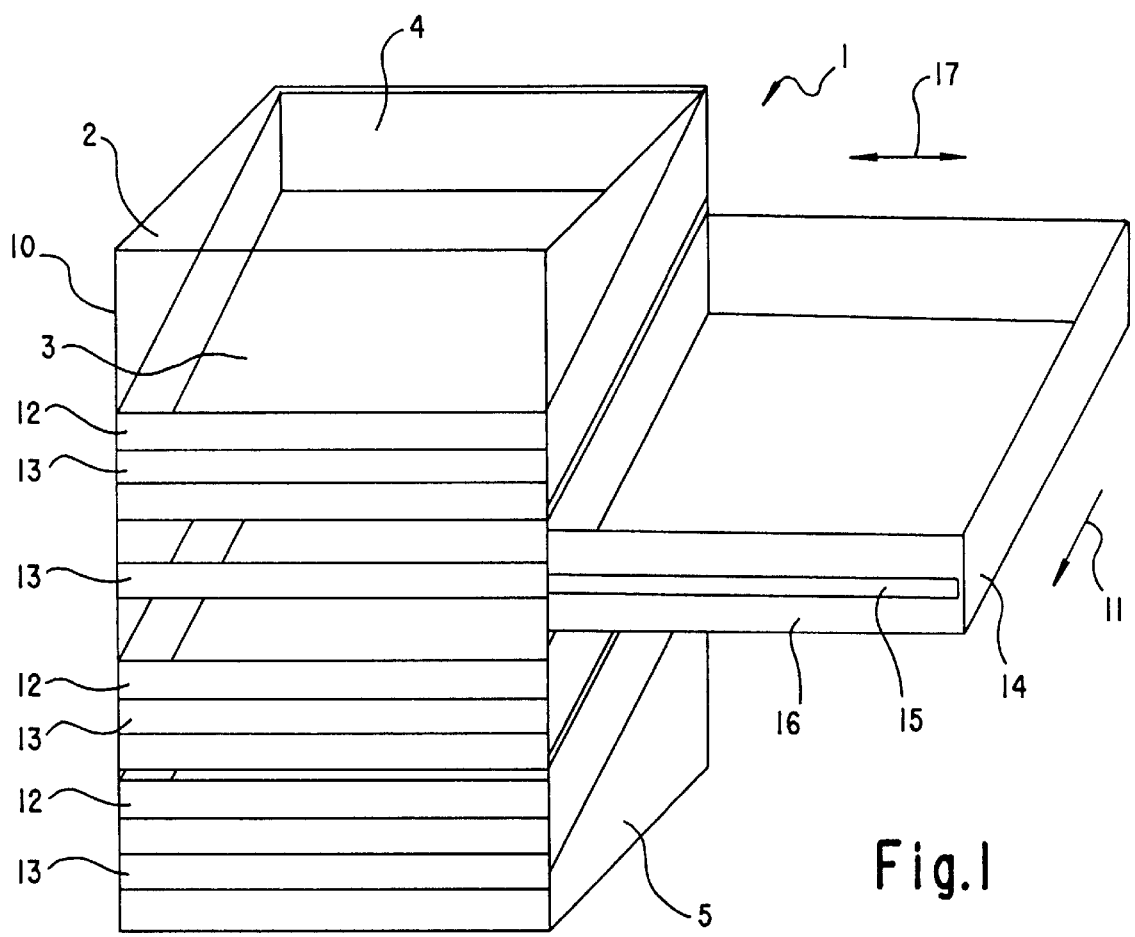
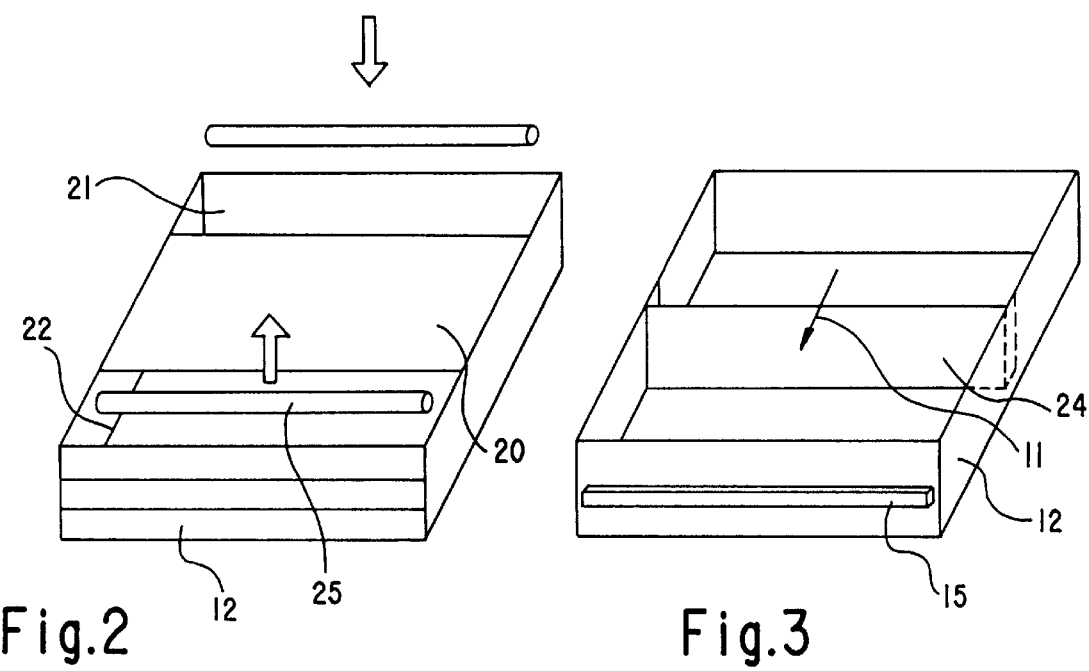

SHELF ASSEMBLY

The present invention relates to a shelf assembly as described in the preamble for claim 1, destined for storing and distributing various sorts of goods, and particularly to a shelf assembly, which comprises a so-called fifo (first in-first out) -arrangement.

The fifo-arrangement generally refers to an arrangement in which an object that is placed on the shelf, in a drawer, in a rack or similar first, is also the first one to be taken out, i.e. the goods placed on the shelf are always used in the order in which they were placed there, in order to assure an even circulation of the goods and also that no object will remain on the shelf longer than the others but will leave there in a predisposed order. With this arrangement it is also possible to minimize the risk of non-marketability e.g. in case of a change in product variation, i.e. the old product is always used up before a first new product can be taken out.

Traditional fifo-shelves or other storage units are generally structured so as to be charged from one side and discharged from the other side. Because of this the fifo-shelves are sometimes called flow-through shelves. There are a large number of different solutions for flow-through shelves, but the basic solution is, however, always the same and it demands free access to both sides of the shelf. The progress of the goods on the shelf from the charging side to the discharging side is usually organized so as to take place by means of gravity, for instance so that a shelf board or a shelf container declines towards the discharging direction.

The weakness of the presented solutions has been, however, that they have demanded space on both sides of the shelf unit, as the preceding example shows. This has lead to inefficient space utilization e.g. in shops, warehouses and industrial establishments. It has been practically impossible to place a flow-through shelf unit e.g. in a corner of a room. In most private homes and corresponding spaces meant for habitation there is usually not enough space for flow-through shelves, which means that this per se practical fifo-arrangement has been impossible to use in homes.

The object of the present invention is to abolish the disadvantages of known techniques and to create a novel solution for a so-called fifo-shelf arrangement. According to the objects of this invention, through the inventive solution it will be possible to create fifo-shelves, which are more efficient in space utilization than the known solutions, which permit a more variable placing of the shelf-unit and which are more adaptable than the previous solutions to different storage and distributional needs of goods, but which arrangement is inexpensive and simple in structure and in realization.

A further object of the present invention is to create a fifo-shelf unit, which demands accessibility only to one side.

A further object of the present invention is to create a shelf unit, that gives the desired shelter to the goods placed on it.

A supplementary object of the invention is a movable shelf unit.

Another supplementary object of the invention is to create a shelf unit, in which the shelf space utilization can be adjusted according to needs.

Another supplementary object of the present invention is a shelf unit, in which the sloping angle of individual shelves can be adjusted as needed.

Another supplementary object of the invention is a shelf unit supplied with suitable driving devices in order to assure a semi-automatic or fully automatic functioning.

Another object of the invention is further to create a shelf unit that comprises control devices for controlling the different functions of the shelf and/or to organize a storage control.

The invention is based on the fundamental idea, that by supplying the shelves of the shelf unit with means for moving individual fifo-shelves on the shelf unit in order to draw a single shelf out of the shelf unit, a structure will be achieved that realizes the object of this invention.

More precisely, the main characteristic of the inventive shelf assembly is what is further claimed in the following claims 1–8 and especially in the characterizing part of the independent claim 1.

According to a preferred embodiment of the present invention the shelf assembly comprises a frame structure, that can be formed of suitable columns or bars etc. devices. According to one alternative the walls of the shelf assembly are covered with suitable plating devices, such as chipboard, timber plate, hardboard plate, plastic board, composite plate or metal plate. According to one alternative the suitable plating devices form by themselves the frame structure of the shelf assembly.

Inside the frame structure suitable shelf devices are adjusted, such as suitable drawers or flat shelves or shelf devices at least partly composed of latticework or network structure or composed at least partly of suitable tube- or pole devices, all of which are of the mentioned fifo type. They are assembled in a movable fashion on the frame structure so that they can be moved in and out of the shelf assembly. This is done preferably with the aid of suitable slide bars or corresponding guide bars. The functioning of the guide bars can be facilitated with suitable reel devices. According to an embodiment the shelves can be locked into the respective position.

According to an embodiment the shelf assembly is supplied with wheels in order to be movable. The inventive shelf assembly can also be adjusted for example in the trunk of a vehicle or in a trailer (such as the so-called ice-cream wagons or food wagons).

According to a preferred embodiment the shelf assembly comprises a suitable door device or a corresponding hatch device for closing the shelf assembly when not in use.

According to an embodiment of the invention an individual fifo-shelf adjusted to be movable is split into several subdivisions.

According to yet another embodiment of the invention the sloping angle of the fifo-shelves is adjustable.

When using the inventive device an individual fifo-shelf is pulled out of the framing structure so as to enable its usage. The shelf is then returned to its storage position. According to an alternative the shelf is adjusted to be moved with a suitable drive device.

Remarkable advantages are obtained with the invention. The placing of the shelf unit is easier than before, because the inventive fifo-shelves can be placed e.g. next to a wall or in a corner or even in a "closet-like" space, since it only demands one free side to it. With the invention considerable economies in the needed floor space are achieved. Furthermore the invention shortens the time needed for loading and unloading the shelves, together with assuring the reliable functioning of the fifo principle. Due to the inventive structure the fifo-shelf assembly will have new application targets, e.g. in homes, schools, hospitals, hotels as well as in industry and office buildings or other establishments of the sort. The invention is easily exploitable also in land-, sea-, and aircrafts. In other words the inventive shelf assembly can be exploited in any environment or in any conditions where there is need for effective space utilization. The goods placed on the shelves are protected better than in conventional flow-through shelves, especially when a suitable door device and a closed wall structure are used. Also the additional inventive equipment according to one embodiment prevent efficiently the so-called over-packing while enabling the highest possible usage level of the shelves.

The invention and its other objects and advantages will be described in the following exemplifying description with reference to the accompanying drawing, in which the corresponding numbers in different drawings refer to the corresponding features respectively. It is to be understood here that the following exemplifying disclosure is not meant to limit the invention to the forms exposed here, but that on the contrary the invention is meant to cover all the variations, equivalences and alternatives that are covered by the spirit and the scope of the invention, as will be put forward in the following claims. It is also to be remarked that the terms shelf or drawer are meant to cover all devices used for the storage of goods, such as different drawers, racks, baskets, boards or other devices, as well as the reel plates customary in the flow-through shelves. In this manner also the shelf material can be of any known and suitable material, such as chipboard, timber plate, hardboard plate, composite plate, plastic board or metal plate or suitable latticework or network structure, or at least partly of a structure obtained from for example wood or metal poles or tubes or other suitable structures. The term good refers to any sort of such object, piece, material or other object that needs to be stored and distributed from its storage position. The scale of this sort of goods is very large and they will accordingly not be specified here in more detail.

FIG. 1 is a simplified schematic perspective view of an embodiment of the present invention.

FIGS. 2–5 are alternative embodiments of the shelves of the inventive shelf assembly.

Figure 4:
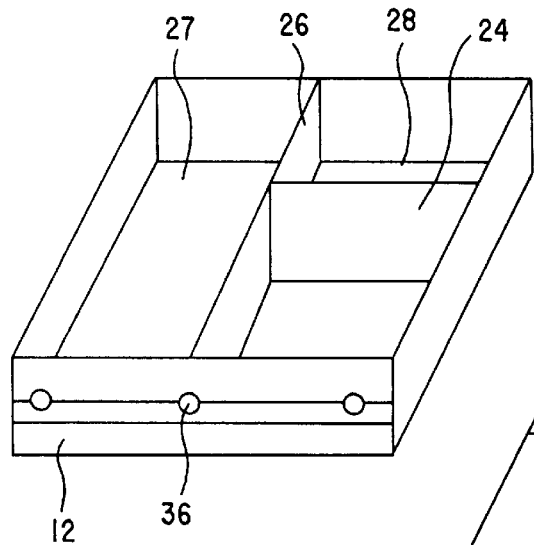

FIG. 1 is a schematic perspective view of the inventive shelf arrangement 1. The frame structure 10 of the shelf assembly is for clarity presented only as a contour line, but the frame structure 10 can naturally be comprised of columns, poles, bars or other such devices and the walls of the shelf assembly, such as 2 and 3, as well as the upper lid 4 can be obtained of suitable plate, such as chipboard, plastic board, sheet metal or other plate material. The plate material can also be perforated plate or the walls can be formed of suitable net or latticework structure, tubes or poles.

The wall plates also in themselves can form a shelf frame structure, in which case special framework bar devices will not be needed at all. According to an alternative the inventive arrangement is placed in a recess formed by the building, in which case the walls of the recess form the frame structure 10 as described in FIG. 1.

Inside the shelf assembly 10 described as a contour line are superposed and suitably inclined a desired amount of shelf boxes 12. An arrow 11 presents the direction of the said inclination or the moving direction of the goods placed on the shelf box 12. One side 3 (the first side in the figure) of the shelf assembly as well as its opposite side (the rear side) and two opposite sides 16 of each shelf box 12 are supplied with suitable joint guide bar devices 13 and 15, such as slide bars. One of the shelf boxes is presented in the pulled out position or the position which enables the utilization of the shelf box. The trajectory of the shelf boxes has been visualized with a two-end arrow 17.

Different possible guide bar devices enabling a linear movement are known by those skilled in the art from e.g. prior art sets of drawers. This is why they will not be presented here in more detail. It will only be mentioned that they can comprise for instance guarding elements in the form of rails adjusted against each other in a sliding manner, or for example reel devices bearing against rails in order to enable an easier sliding movement.

According to one alternative the guide bar arrangement is such that the sloping angle of the boxes is easily adjustable. In this case e.g. the rail device 13 can be attached in such a manner that it can be moved upwards or downwards as well as sideways to the shelf assembly within the range of the shelf box to compensate the change occurred in the lifting or the lowering of the other end of the shelf box.

FIG. 1 illustrates how the inventive structure yields to a shelf arrangement that functions with the fifo-principle and that need not be of the so-called flow-through type but that only demands free space on the front side 5. The goods and products placed in the inventive shelf box 12 move according to the direction shown by the arrow 11 sideways on the shelf assembly from placing end towards the extraction end.

The user end 5 of the shelf assembly can be supplied with a door or a corresponding hatch device (FIG. 6) when needed, and which can also be locked. The shelves 12 can also be locked in their open-position and/or in-position either individually, selectively or all simultaneously The shelf assembly 1 can also be supplied with suitable wheel devices (not shown) in order to enable it to be moved. One appliance target given here as an example is the service trolleys used in aeroplanes or trains. According to another approach the shelf device is placed in connection with a trailer or a vehicle, e.g. in the trunk of a delivery van e.g. so that it can be utilized through the door of the vehicle while the walls of the vehicle also form the frame structure of the shelf assembly.

FIGS. 2–5 present in more detail different arrangements to assure for example that each piece of goods is retrieved from the shelf in due order. Further devices are presented to enable dividing one shelf box 12 into several divisions.

FIG. 2 is a schematic view of one shelf box 12 where a crown plate device 20 has been placed in contact with its upper part so that openings 21 and 22 will be formed in the two ends of the box. The goods 25 stored in the box and retrieved from the box are arranged to be put in through the opening 21 and to be retrieved through the opening 22. According to one alternative at least one of the openings 21 and 22 has to be adjustable e.g. in a manner that the crown plate device 20 is formed of two mutually movable parts. The crown plate device 20 hinders, among other things, overpacking the shelf box 12, so that an essentially short distance can be left between the said shelf box and the shelf box above, which in turn enables a more effective space utilization. The crown plate device 20 can also be formed of lattice work or a netlike structure made of tubes and poles.

FIG. 3 illustrates a movable baffle plate device 24 which advances according to the direction shown by the arrow 11 as the goods in the lower end of the shelf box 12 are used up. The baffle plate device 24 is advantageous e.g. when it is necessary to separate several lots of goods placed in the shelf box 12 for example by their freshness. There can be more than one plate device in one shelf box when needed. The construction of the plate device 24 can be of a simple type shown in FIG. 3 or there can be suitable guide bar devices between the plate and the shelf box, in order to guide its movements. In some cases the baffle plate device 24 can be supplied with suitable driving devices so that the advancement of the goods on the shelf board can be controlled by its movement.

In the end of shelf box 12 a suitable guide bar device can be seen, that comprises an essential rectangular guide bar 15, adjusted to be placed on the counterpart mounted in the shelf frame structure in a per se known manner.

FIG. 4 illustrates a shelf box 12 that has been divided laterally into several divisions 27 and 28. In division 28 a movable baffle plate device 24 has also been placed. The width of the divisions can be adjusted if needed.

In the rear end of shelf box 12 suitable reel devices 36 are also presented, with which moving shelf box 12 in the counterpart of the shelf frame structure has been made as easy as possible.

Figure 5:
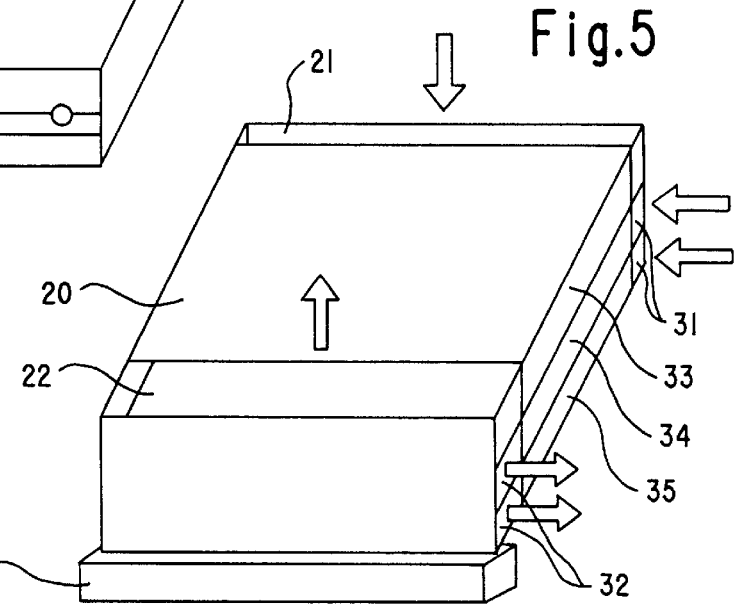

FIG. 5 illustrates a further application of a fifo shelf box 12. According to this the fifo shelf box 12 has been divided in altitude into at least two, in FIG. 5 into three separate divisions 33, 34 and 35. The charging and discharging of the uppermost subdivision 33 takes place through the openings 21 and 22 situated on top of the shelf box. The charging and discharging of the divisions 34 and 35 take place through the openings 31 and 32 situated on the sides of the shelf box in a manner indicated by the arrows.

FIG. 5 further illustrates schematically an arrangement in which no specific guide bar devices have been placed to the end of shelf box 12, but in which a sufficiently wide bracket 13 has been placed on the shelf frame structure, that is matched to bear a movable fifo shelf box 12 from its lower angle. This sort of bracket may also be adjustable in a prior art, fashion in elevation so that the adjustment of the inclination of the fifo shelf box is especially simple to perform. The adjustment of the inclination of the shelf enables to influence e.g. the "sensibility" of the movement, due to gravity, of the goods placed on the shelf and also to adjust the same shelf suitable to objects with different moving characteristics.

Figure 6:
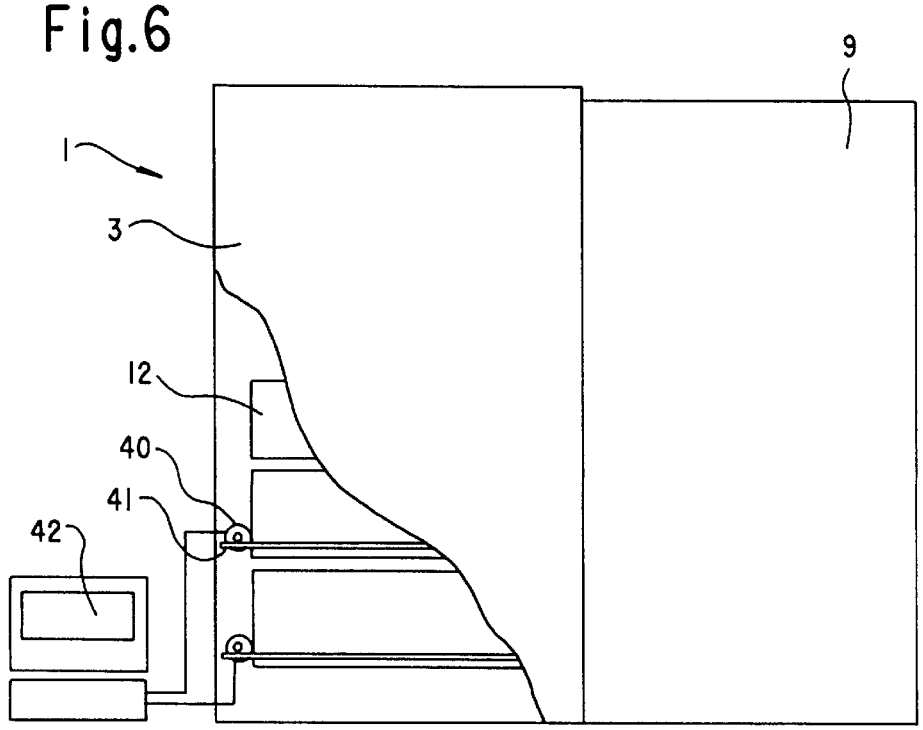
FIG. 6 is a partly incised schematic perspective view of one supplementary embodiment of the invention.

FIG. 6 is a schematical and partly incised view of one embodiment of the invention. According to this the shelf unit comprises also a drive device, such as an electric motor or suitable cylindrical devices (not shown) to move the shelves in a desired manner. FIG. 6 illustrates a solution in which a motor 40 has been placed at the end of the shelf box 12, the drive wheel or gear of which motor is functionally in contact with a pole 41 attached to the shelf frame structure. In this manner when the motor 40 is running the shelf box 12 moves in proportion to the pole 41, e.g. a gear rack, and at the same time also in proportion to the shelf frame structure.

According to one preferential solution the movement of the shelves to one direction is adjusted to take place due to gravity. In such a case the guide bar devices are adjusted to incline either towards the out-position or the inwards-position as needed. In such a case it may also be suitable to supply the shelf assembly with suitable locking devices in order to hold each position of the shelf box 12.

The shelf assembly can also be supplied with suitable cleaning openings. The cleaning openings are located preferentially on the lower part of the shelf assembly either on one side or at the bottom of the shelf assembly.

The openings can be supplied with a suitable protective lid. According to one alternative the bottom part of the shelf assembly is open, so that when litter etc. objects that fall downwards in the shelf exit automatically through the bottom part for instance into a suitable collecting device placed under the shelf assembly or on the floor. The cleaning openings are useful when drawers are used, the bottom parts of which and possibly also the crown plate device 20 are formed to contain holes e.g. due to their latticework or network structure or a structure of tubes or poles.

FIG. 6 further illustrates a suitable control unit device, here a microprocessing device 42, which enables to control all the functions of the shelf unit 1 in a centralized manner, such as the moving and locking of shelf boxes 12, the position and the state of locking of the door device 9, the position and the state of the baffle plate devices placed on the shelves etc. The control unit device can further comprise means to organize the surveillance of the stocks as well as announce when one of the shelves is emptying or is already empty. These kinds of devices can comprise e.g. suitable probing devices connected functionally to the control unit; however, they are not shown here.

FIG. 6 also illustrates a door device 9 in the open position.

The inventive shelf assembly creates a considerable improvement compared to known shelf arrangements. The innovative shelf assembly creates a possibility to fundamental, effective and variable space utilization, it is easy to use and reliable in its functions, but at the same time simple of structure and easy to make.

It is to be noticed that the preceding examples of the embodiments of the invention don't limit the scope of protection of the invention presented in the claims. With the aid of the preceding description and the drawings it is evident for one skilled in the art to create a shelf assembly according to the invention, in which suitable hinging devices are used instead of slide bars, for instance in a manner that the shelf box device 12 is hinged from one corner and in such a way it can be rotated between two functioning positions.

What is claimed is:

1. A shelf assembly, comprising a shelf frame structure and at least one drawer, wherein
    said at least one drawer is arranged to be moved in relation to the shelf frame structure with aid of suitable guide devices, along a linear path from a storage position inside the shelf frame structure to a position at least partly out of the shelf frame structure for gaining access to goods placed in the drawer,
    said at least one drawer is inclined such that goods placed in the drawer are arranged to move from a first end of the drawer to a second end of the drawer by means of gravity,
    wherein said at least one inclined drawer is covered by a plate, such that an opening is formed to the first end of the drawer for charging of the goods and an opening is formed to the second end of the drawer for discharging the goods, whereby the drawer forms a flow-through shelf unit operating according to a first in-first out principle.

2. A shelf assembly according to claim 1, wherein walls of said shelf assembly are at least partly made of at least one of chipboard, timber plate, plastic board, hardboard plate, composite plate and metal plate.

3. A shelf assembly according to claim 1, further comprising a door or a corresponding hatch means placed on a trajectory of said at least one drawer.

4. A shelf assembley according to claim 1, further comprising a baffle plate means adjusted to be moved in the direction of the movement of the goods placed on the drawer.

5. A shelf assembly according to claim 1, wherein the drawer is further divided into several subdivisions.

6. A shelf assembly according to claim 1, comprising means enabling movement of the shelf assembly.

7. A shelf assembly according to claim 1, further comprising drive means to move said at least one drawer.

8. A shelf assembly according to claim 1, further comprising microprocessor device to control different functions of the shelf assembly.

9. A shelf assembly as recited in claim 1, wherein said suitable guides devices comprises slide bars.

10. A shelf assembly as recited in claim 1, wherein said suitable guide devices comprise a combination of rails and reels.

11. A shelf assembly as recited in claim 1, wherein said drawer of said shelf assembly is at least partly made of at least one of chipboard, timber plate, plastic board, hardboard plate, composite plate, and metal plate.

12. A shelf assembly as recited in claim 1, wherein walls of said shelf assembly are at least partly made of a latticework material.

13. A shelf assembly as recited in claim 1, wherein said drawer of said shelf assembly is at least partly made of a latticework material.

14. A shelf assembly as recited in claim 1, wherein walls of said shelf assembly are at least partly made of a netlike material.

15. A shelf assembly as recited in claim 1, wherein said drawer of said shelf assembly is at least partly made of a netlike material.

16. A shelf assembly as recited in claim 1, wherein walls of said shelf assembly are at least partly made of a structure having a tube configuration.

17. A shelf assembly as recited in claim 1, wherein said drawer of said shelf assembly is at least partly made of a structure having a tube configuration.

18. A shelf assembly as recited in claim 7, wherein said drive means comprises an electrical motor.

19. A shelf assembly as recited in claim 7, wherein said drive means comprises cylinder means for moving said at least one drawer.

20. A shelf assembly as recited in claim 1, wherein said at least one inclined drawer is configured to be movable along a linear path which is orthogonal with respect to a direction of flow of the goods.

* * * * *